United States Patent [19]

Takahashi

[11] Patent Number: 4,527,424

[45] Date of Patent: Jul. 9, 1985

[54] SYSTEM FOR DIAGNOSING AN INTERNAL COMBUSTION ENGINE

[75] Inventor: Toshio Takahashi, Mitakashi, Japan

[73] Assignee: Fuji Jukogyo Kabushiki Kaisha, Tokyo, Japan

[21] Appl. No.: 535,492

[22] Filed: Sep. 26, 1983

[30] Foreign Application Priority Data

Oct. 1, 1982 [JP] Japan .............................. 57-173622

[51] Int. Cl.³ .......................................... G01M 15/00
[52] U.S. Cl. .................................. 73/119 A; 73/117.3
[58] Field of Search .................... 73/116, 118, 119 R, 73/119 A, 117.3; 340/52 R, 52 F; 123/480, 494

[56] References Cited

U.S. PATENT DOCUMENTS

| | | | |
|---|---|---|---|
| 3,919,885 | 11/1975 | Kaireit | 73/119 A |
| 3,938,075 | 2/1976 | Reddy | 340/52 R |
| 4,119,070 | 10/1978 | Asano | 73/119 A X |
| 4,219,798 | 8/1980 | Frister | 340/52 F |
| 4,244,340 | 1/1981 | Herth et al. | 123/440 |
| 4,246,566 | 1/1981 | Endo et al. | 340/52 F |

Primary Examiner—Jerry W. Myracle
Attorney, Agent, or Firm—Martin A. Farber

[57] ABSTRACT

A system for diagnosing an internal combustion engine. The system comprises: a control signal generating system for monitoring the operation of the engine, such ignition, and for generating a control signal; a driven system, such as a fuel injection system, operated in dependency on the control signal. A first diagnosis circuit is provided for diagnosis of the operation of the control signal generating system and for producing an output when trouble occurs in the system; and a second diagnosis circuit is provided for diagnosing the operation of the driven system and for producing an output when trouble occurs in the system. Results of diagnosis by the first and second diagnosis circuits are indicated by lamps. A logic gate is provided to be controlled by the output of the first diagnosis circuit so that the lamp for the second diagnosis circuit does not indicate trouble in the driven system.

6 Claims, 5 Drawing Figures

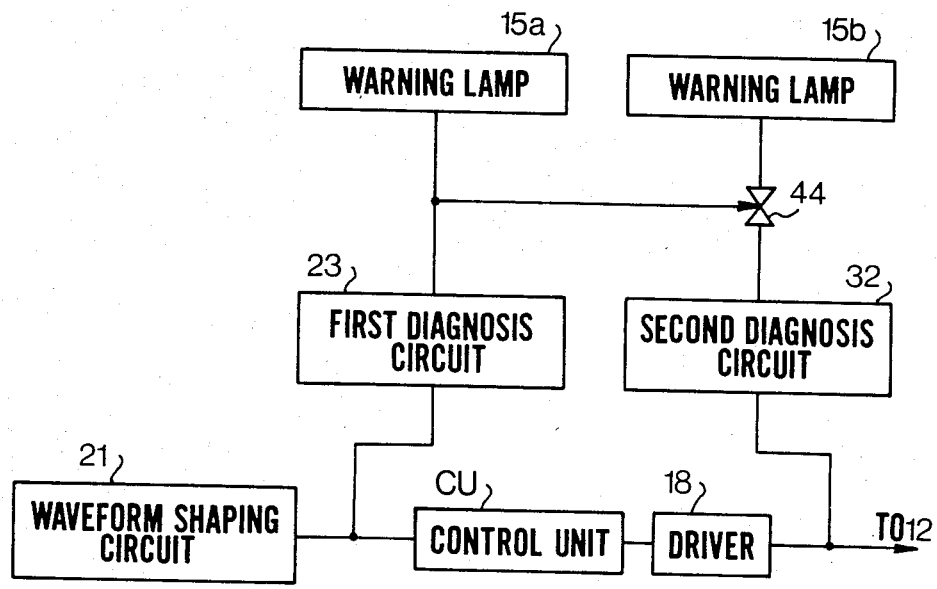

SYSTEM FOR DIAGNOSING AN INTERNAL COMBUSTION ENGINE

BACKGROUND OF THE INVENTION

The present invention relates to a diagnosis system for internal combustion engines, and more particularly to a system for diagnosing failure of two or more devices in an engine mounted on a motor vehicle.

An electronic fuel-injection system of the type which is provided with a computer operable to compute various factors, such as throttle position, ignition signal, intake manifold vacuum and coolant temperature in order to produce output signals for driving solenoid-operated fuel injection valves is known. The solenoid operated fuel-injection valves are driven in dependency on the ignition signal which represents the position of the ignited cylinder and the ignition timing. A conventional diagnosis system is provided with a first diagnosis system for a control signal generating system such as the ignition signal generating system and a second diagnosis system for a driven system such as the fuel injection system. Both systems are separately provided, and each diagnosis system has an indication device so as to signal an alarm in the event of a fault in its own system regardless of the conditions of the other system. In such a system, if a failure occurs in the control signal generating system, the driven system is not operated. Therefore, the first diagnosis system indicates the fault in the control signal generating system and the second diagnosis system also provides the alarm in spite of a normal condition of the driven system as if there is a fault in the system.

SUMMARY OF THE INVENTION

The object of the present invention is to provide a diagnosis system with two or more systems, one of which is a control signal generating system and the other is a driven system driven by the control signal, which indicates trouble in the systems without misinformation.

According to the present invention, there is provided a system for diagnosing an internal combustion engine, comprising:

a control signal generating system for monitoring the operation of said engine and for generating a control signal;

a driven system operated in dependency on said control signal;

a first diagnosis circuit for diagnosing the operation of said control signal generating system and for producing an output when trouble occurs in the system;

a second diagnosis circuit for diagnosing the operation of said driven system and for producing an output when trouble occurs in the system;

indicator means for indicating results of diagnoses by the first and second diagnosis circuits; and gate means controlled by the output of said first diagnosis circuit so that the indicator means for said second diagnosis circuit does not indicate trouble in said driven system.

The present invention will be more apparent from the following description made with reference to the accompanying drawings.

BRIEF DESCRIPTION OF DRAWINGS

FIG. 3 is a truth table of the circuit of FIG. 2;

FIG. 4 is a block diagram of the circuit of FIG. 2; and

DETAILED DESCRIPTION OF THE PREFERRED EMBODIMENTS

Figure 1:
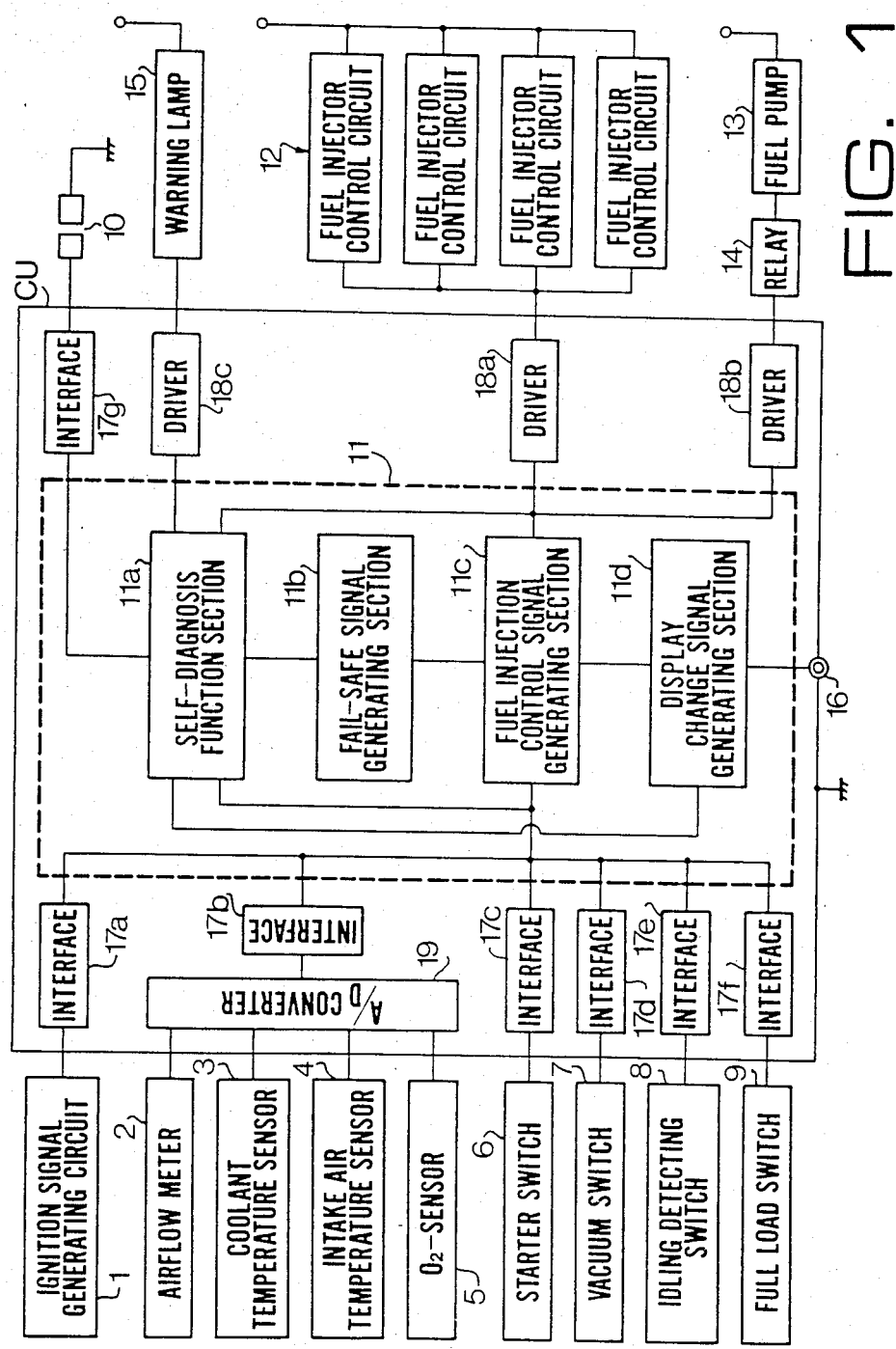
FIG. 1 is a block diagram showing a diagnosis system for operation of an engine.

FIG. 1 diagrammatically shows a diagnosis system for operation of an engine including a system of the present invention. The system comprises an engine operation detecting means group 1 to 9, and a control unit CU. The control unit CU comprises a computer 11 including memories, I/O and timers, an interface group 17a to 17g, and drivers 18a to 18c. The detecting means group comprises an ignition signal generating circuit 1, the output signal of which represents an ignited cylinder of the engine and the ignition timing thereof, an airflow meter 2, a coolant temperature sensor 3, an intake air temperature sensor 4, and an $O_2$-sensor 5 for detecting the oxygen concentration in exhaust gases from the engine. The detecting means group further comprises a starter switch 6 for detecting the operation of the starter of the engine, a vacuum switch 7 for detecting the vacuum in the intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking fault. When the terminal 10 is connected to the ground at a shop, a fault condition memorized in the display change signal generating section 11d is displayed by a lamp 16. During driving of the motor vehicle, the terminal 10 is disconnected from the ground. The output of the ignition signal generating circuit 1 is applied to the self-diagnosis section 11a and the fuel injection control signal generating section 11c through the interface 17a. The outputs of the airflow meter 2 and the sensors 3 to 5 are applied to the section 11a and 11c through an A/D converter 21 and the interface 17b. Further, the outputs of switches 6 to 9 are applied to the sections 11a and 11c through the interfaces 17c to 17f, respectively.

The self-diagnosis function section 11a monitors inputs from the engine operation detecting means group 1 to 9 and when any fault is detected, a signal is sent to a warning lamp 15 through the driver 18c to warn of the fault during the driving of the vehicle. Further, upon the occurrence of serious engine trouble which would stall the engine, the self-diagnosis function section 11a sends a diagnosis signal dependent on the kind of the engine trouble to the fail-safe signal generating section 11b. The fail-safe signal generating section 11b stores a plurality of data to avoid the stalling of the engine caused by the engine trouble and produces a fail-safe signal dependent on the diagnosis signal. The fail-safe signal is fed to the fuel injection control signal generating section 11c which operates so as to stop the input from the detecting means group 1 to 9.

In normal engine operation, the fuel injection control signal generating section 11c operates to produce an air-fuel ratio control signal by computing the inputs applied from the engine operation detecting means group 1 to 9. The air-fuel ratio control signal is fed to a fuel pump 13 through the driver 18b and a relay 14 and to fuel injector control circuits 12 through the driver 18a so as to inject a proper amount of fuel at a proper time. Further, the fuel injection control signal generating section 11c send a signal to the switching section 11d in response to an input from the $O_2$-sensor 5. The switching section 11d sends a signal to a monitor lamp 16 in response to the signal from the fuel injection control signal generating section 11c to indicate the fact that the exhaust gases have a normal oxygen concentration.

When the fail-safe signal is fed from the fail-safe signal generating section 11b to the fuel injector control signal generating section 11c, the section 11c produces a quasi air-fuel ratio control signal dependent on the fail-safe signal. The quasi air-fuel ratio control signal is sent to the fuel injection control circuits 12, so that the engine continues to operate in accordance with the quasi signal without stalling.

Further, the switching section 11d sends a signal to the lamp 16 in dependency on the diagnosis signal fed from the self-diagnosis function 11a. The lamp 16 intermittently lights in accordance with a pattern which is decided by the diagnosis signal by connecting the terminal 10 to the ground at a shop. An inspector in the shop or the driver of the motor vehicle can recognize the type of engine trouble by the pattern of lighting of the lamp 16.

Figure 2:
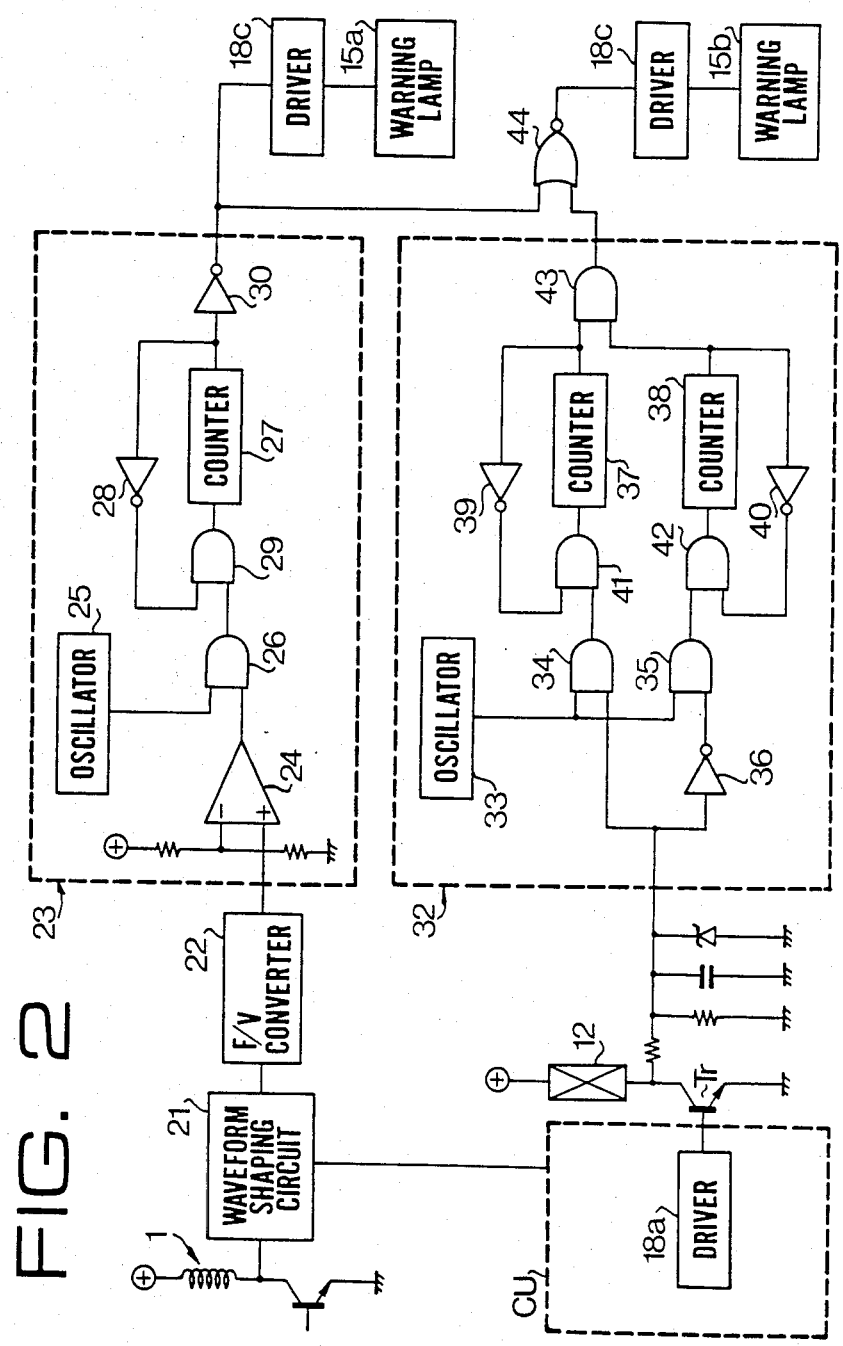
FIG. 2 is a diagnosis circuit for a fuel injection system according to the present invention.

FIG. 2 shows a first diagnosis circuit 23 for an ignition signal generating system and a second diagnosis circuit 32 for a fuel injection system. The output of the ignition signal generating circuit 1 is fed to a frequency-to-voltage converter (F/V converter) 22 through a waveform shaping circuit 21. The output voltage of the F/V converter 22 is fed to a comparator 24 in the first diagnosis circuit 23. The output of the comparator 24 is applied to an input of an AND gate 26. The other input of the AND gate is applied with pulses from an oscillator 25. The output of the AND gate 26 is applied to a counter 27 through and AND gate 29. The output of the counter 27 is applied to the driver 18c and a NOR gate 44 through an inverter 30 and is also applied to the other input of the AND gate 29 through an inverter 28 in order to keep the output of the counter.

The voltage at a transistor Tr in the circuit of the fuel injector control circuit 12 is applied to an AND gate 34 in the second diagnosis circuit 32 and is also applied to an AND gate 35 through an inverter 36. AND gates 34 and 35 are applied with pulses from an oscillator 33 to produce pulses dependent on the inputs from the fuel injector control circuit 12.

The second diagnosis circuit 32 is provided with a first counter 37 and a second counter 38. The output of the AND gate 34 is fed to the counter 37 through and AND gate 41 and the output of the AND gate 35 is fed to the counter 38 through and AND gate 42. The outputs of the counters 37 and 38 are applied to the NOR gate 44 through an AND gate 43. Further, the outputs of the counters 37 and 38 are applied to the inputs of the AND gates 41 and 42 through inverters 39 and 40, respectively.

Diagnosis according to the system of FIG. 2 is performed at the shop. In normal operation, the output of the F/V converter 22 is higher than a low reference value No which corresponds to a very low engine speed. Therefore, the AND gate 26 produces pulses which are applied to the counter 27. When the count reaches a set count, the output of the counter becomes high. The output is inverted by the inverter 30, so that a warning lamp 15a also is not lighted, and a lamp 15b is not lighted if the output II of the second diagnosis circuit 32 is at high level (column A in the truth table of FIG. 3). On the other hand, if the fuel injector control circuit 12 normally operates, the voltage at the transistor Tr has a waveform dependent on the ON-OFF condition of the transistor. The high level output is applied to the AND gate 34 and a low level output is applied to the AND gate 35, respectively. Pulses produced from the AND gate 34 are counted by the counter 37 and pulses from the AND gate 35 are counted by the counter 38. In normal operation, counts of both counters 37 and 38 reach their set counts, respectively, and the output II of the AND gate 43 becomes high. Thus, the warning lamp 15b is not lighted.

If trouble occurs in the ignition signal generating circuit 1, the output of the comparator 24 is at a low level and no signal is applied to the counter 27. Therefore, the output I is at a high level and the warning lamp 15a indicates the trouble. Further, the high level output I is applied to the NOR gate 44, so that the output III is at a low level regardless of the output II of the second diagnosis circuit 32. Accordingly, the warning lamp 15b is not lit even if trouble occurs in the fuel injector control circuit 12 (columns C, D of FIG. 3). When trouble occurs in the fuel injector control circuit 12, only one of the AND gates 34 and 35 operates or both AND gates do not operate. Therefore the output II of the AND gate 43 becomes low. If the output I is at a low level, which means that the circuit 1 operates normally, the output III of the NOR gate 44 goes to a high level and the lamp 15b indicates the trouble (column B of FIG. 3). If the output I is at a high level, the trouble in the circuit 12 is not indicated. However, when the trouble in the circuit 1 is removed, the trouble in the circuit 12 is indicated.

Figure 5:
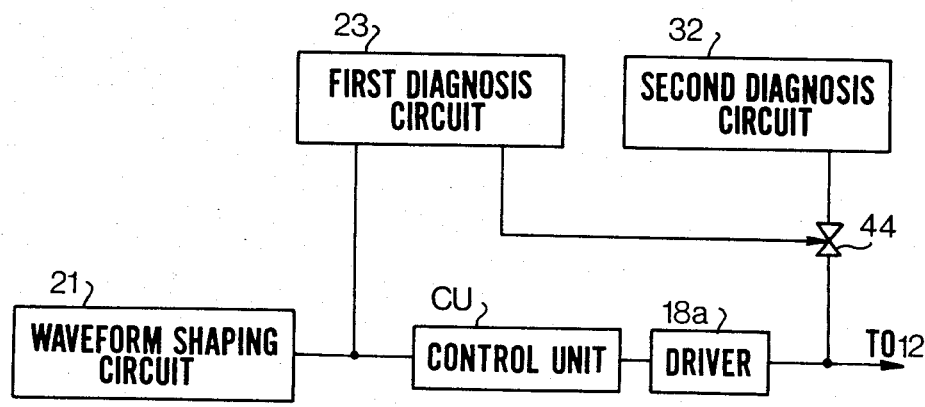
FIG. 5 is a block diagram showing another embodiment of the present invention.

FIG. 4 shows a block diagram of the diagnosis circuit of FIG. 2. From the figure, it will be seen that the output signal of the first diagnosis circuit acts as a control signal for the gate 44. In the system of FIG. 5, an output signal from the first diagnosis circuit 23 controls the gate 44.

While the presently referred embodiments of the present invention has been shown and described, it is to be understood that this disclosure is for the purpose of illustration and that various charges and modifications may be made without departing from the spirit and scope of the invention as set forth in the appended claims.

What is claimed is:

1. A system for diagnosing an internal combustion engine, comprising a control signal generating system for monitoring the operation of said engine and for generating a control signal;

a driven system operated in dependency on said control signal;

a first diagnosis circuit for diagnosing the operation of said control signal generating system and for producing an output when trouble occurs in the control signal generating system;

a second diagnosis circuit for diagnosing the operation of said driven system and for producing an output when trouble occurs in the driven system;

indicator means for indicating results of diagnoses by said first and second diagnosis circuits; and gate means controlled by the output of said first diagnosis circuit so that the indicator means for said second diagnosis circuit does not indicate trouble in said driven system.

2. The system according to claim 1 wherein said gate means is a logic gate.

3. The system according to claim 1 wherein said gate means is provided between the output of said second diagnosis circuit and said indicator means.

4. The system according to claim 3 wherein said driven system is a fuel injection system.

5. The system according to claim 1 wherein said gate means is provided in an input circuit for said second diagnosis circuit.

6. The system according to claim 1 wherein said control signal generating system is an ignition signal generating system.

* * * * *